Dec. 12, 1933.  J. K. ROBERTS  1,939,633
STABILIZATION OF LIGHT HYDROCARBON OILS AND PARTICULARLY PRESSURE DISTILLATE
Filed Dec. 18, 1930
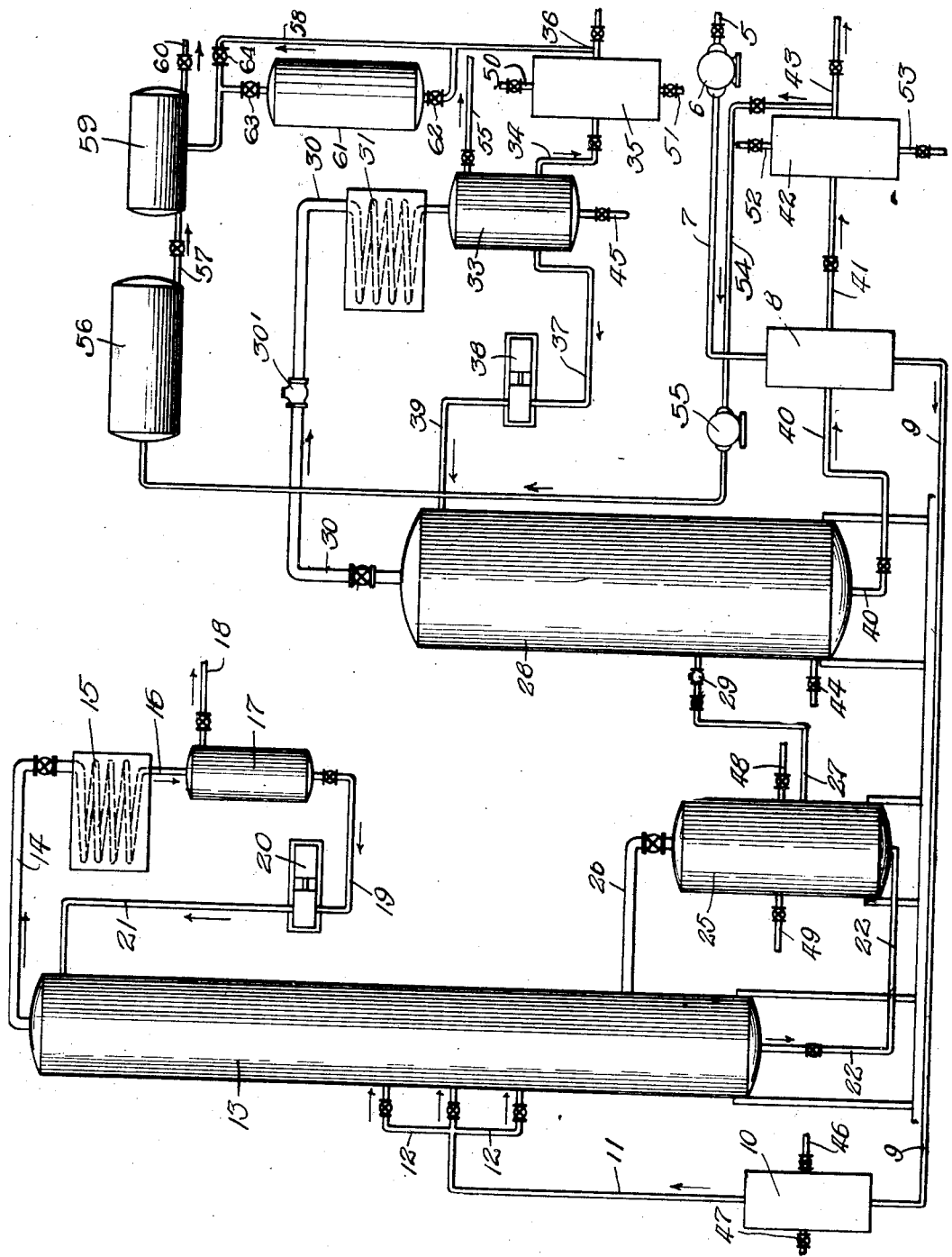
Inventor:
Joseph K. Roberts, Patented Dec. 12, 1933

1,939,633

UNITED STATES PATENT OFFICE 1,939,633

STABILIZATION OF LIGHT HYDROCARBON OILS AND PARTICULARLY PRESSURE DISTILLATE

Joseph K. Roberts, Hammond, Ind., assignor to Standard Oil Company, Whiting, Ind., a corporation of Indiana Application December 18, 1930. Serial No. 503,303

8 Claims. (Cl. 196—11)

This invention relates to the stabilization of light hydrocarbon oils, and particularly to the stabilization of pressure distillates of hydrocarbon oils. The invention will be more fully understood by reference to the following description in conjunction with the accompanying drawing which is an elevational view, somewhat diagrammatic in character, of apparatus suitable for carrying out the process of the invention.

Referring more in detail to the drawing, a valved line 5 leads from any suitable source of light hydrocarbon oils, which contain excessively volatile constituents, to a pump 6, by which the oil is forced through a line 7 to a heat exchanger 8. The oil is passed through heat exchanger 8 wherein it is heated as hereinafter set forth, and then through line 9 leading to a second heat exchanger 10, wherein it is further heated. From the latter it passes through line 11 to one of a plurality of valved inlets 12 which discharge into a column 13 at spaced intermediate points thereof. The column 13 is maintained at a substantial superatmospheric pressure, for example 250 pounds.

The column 13 is provided internally with a plurality of spaced fractionating elements (not shown) of any suitable type, for example bubble cap plates, screen plates, or ring and disk plates. The heated oil discharged into the column 13 is subjected to rectification therein to remove therefrom substantially all of the excessively volatile constituents undesired in the final distillate product. A portion of the oil is vaporized in the column 13, the vaporized portion consisting in part of the undesired excessively volatile constituents and in part of the lower-boiling, desired constituents. The vapors ascend through the column 13, and are fractionated therein, the uncondensed vapors passing out through a valved vapor line 14 leading to a condenser 15 wherein a portion of the vapors is condensed for reflux. The condensate together with the uncondensed excessively volatile vapors or gases are passed from condenser 15 through a line 16 to a separator 17 wherein the condensate and gases or vapors are separated, the latter being withdrawn therefrom, and from the system, through a valved line 18. The separated condensate is passed from separator 17 through a line 19 to a pump 20 by which it is forced through a line 21 into the upper portion of the column 13 to serve as a downwardly flowing reflux cooling medium therein.

The unvaporized portions, from which a substantial portion of the undesired excessively volatile constituents have been removed, are withdrawn from the bottom of column 13 through a valved line 22, to a heat-exchanger 25 wherein they are subjected to additional heating to effect re-boiling thereof and consequent vaporization of the remaining undesired excessively volatile constituents thereof. The vapors thus formed are passed from heat-exchanger 25 through a line 26 to the bottom of the column 13, preferably above the level of liquid therein, and impart heat to the downflowing oil in the column. The remainder of the heated oil, i. e., the unvaporized oil, is passed from the lower portion of heat-exchanger 25 through a line 27 to a low pressure chamber 28. The line 27 is provided with a pressure reducing valve 29 for effecting a material reduction of pressure upon the heated liquid oil discharged into the chamber 28 causing the lower boiling portions desired in the final product to be flashed into vapors by the contained heat of the oil.

The chamber 28 may be of any suitable construction and may contain elements for effecting intimate contacting of vapors and liquids therein, for example, fractionating elements may be provided therein which are of a type similar to those employed in the column 13. The vapors in the chamber 28 are subjected to fractionation therein. The fractionated vapors, comprising light desired fractions are withdrawn from the top of chamber 28 through valved line 30, provided with a pressure regulating valve 30', and are passed therethrough to a condenser 31 wherein the constituents desired in the final product are condensed. The condensate is passed from condenser 31 to receiver 33 wherein any water contained in the distillate may be separated and drawn off by line 45.

The condensate, comprising a low-boiling liquid fraction, desired in the final distillate product and substantially free from undesired excessively volatile constituents, may be withdrawn from the separator 33 and passed to a cooler 35 through a valved line 34 wherein it is cooled. The cooled low-boiling stabilized fraction is passed from the cooler 35 and from the system through a valved line 36 or may be subjected to a sweetening operation as hereinafter described. The top of the column or chamber 28 may be supplied with a suitable cooling medium for example, a portion of the low-boiling liquid fraction may be passed from separator 33 through a valved line 37 to a pump 38 by which it is forced through line 39 into the upper portion of the chamber 28 wherein it serves as a reflux cooling medium.

The heavier liquid fraction which is substantially entirely free of undesired excessively volatile constituents is passed from the bottom of chamber 28 through a valved line 40 to the heat exchanger 8 wherein it is partially cooled by the cooler fresh stock passed therethrough from line 7. The partially cooled heavy stabilized liquid fraction is passed through heat exchanger 8 and a valved line 41 to a second heat exchanger 42 wherein it is further cooled. The cooled stabilized heavy liquid fraction is discharged from heat exchanger 42 and from the system through a valved line 43 and thence may be conducted by valved line 54 and if desired by pump 55 into refining unit shown diagrammatically at 56. After undergoing suitable refinement, as by rerunning to remove undesirable heavy ends and chemical treatment to sweeten, the said stabilized heavy liquid fraction is discharged through valved line 57 into the blending unit, shown diagrammatically at 59. The condensed low boiling liquid fraction from valved line 36 is led by valved line 58 into the blending unit 59 and there blended with the stabilized heavy liquid fraction. The blended stabilized pressure distillate is conducted from the blending unit by valve line 60.

If desired the condensed low boiling liquid fraction may be subjected to a sweetening operation, in apparatus indicated diagrammatically by reference numeral 61, before being blended with the stabilized heavy liquid fraction, in blending unit 59. This operation may be accomplished by opening valves 62 and 63 and closing valve 64.

A valved line 44 leading from any suitable source of steam may be connected to the lower portion of chamber 28, whereby stripping of the oil contained therein may be effected.

A suitable fluid heating medium may be passed to heat exchangers 10 and 25, through valved lines 46 and 48, respectively, the spent heating fluid being withdrawn from said heat exchangers through valved lines 47 and 49, respectively. Coolers 35 and 42 may be supplied with cooling fluid by valved lines 50 and 52, the spent cooling fluid being withdrawn from coolers 35 and 42 through valved lines 51 and 53, respectively.

The upper portion of separator 33 may be provided with a valved line 55 for sweeping out any gas or vapors from the system.

In carrying out the invention, the pressure distillate is introduced into the chamber 13, under predetermined temperature and pressure conditions, wherein it is subjected to a rectification operation, substantially all of the excessively volatile constituents thereof which are undesired in the final distillate product being separated therefrom in the form of vapors and gases. Control of fractionation in column 13 is conveniently secured by keeping a constant temperature in the reboiler 25. The distillate product of the stabilization operation is passed while hot to the chamber 28 wherein it is flashed at lower pressure to cause certain of the lighter fractions thereof desired in the final product to vaporize by their contained heat.

The condensed light portion substantially free of undesired excessively volatile fractions may be withdrawn from the receiver 33 and blended with the heavier stabilized liquid portion formed in the flashing operation to produce the final stabilized distillate product. It is preferred to subject the heavier product, which forms the major portion of the final distillate product, to a suitable refining operation 56 before blending it with the lighter product as at 59. Such refining operations are well known in the art and may suitably comprise a chemical treatment and re-running to remove any undesired heavy ends.

In a specific operation, the light hydrocarbon which is to be stabilized, and which may comprise, for example, a pressure distillate produced in a hydrocarbon oil conversion or cracking process operating under a superatmospheric pressure, may be preheated before it is introduced in column 13, in heat-exchangers 8 and 10 to a temperature of 330° F. and the column 13 may be maintained under 250 lbs. pressure. Under such pressure conditions, the body of liquid in the re-boiler 25 may be maintained at 390° F. by regulating the amount of the heating fluid supplied thereto. Under such pressure and temperature conditions, the top of the column 13 will be at about 131° F. The separator 17 may be maintained at about 100° F.

The chamber 28 may be maintained under superatmospheric pressure lower than that in tower 13, say about 30 lbs. and at a temperature of 340° F. at its lower end and at a temperature of 172° F. at its upper end, the latter temperature being maintained by controlling the amount of condensate passed thereto from the separator 33 by lines 37 and 39 and pump 38. The separator 33 may be maintained at 120° F. and under substantially the same pressure as that within the chamber 28.

The stabilized heavier fraction, withdrawn through line 43, after being subjected to a suitable refining operation as at 56, for example, rerunning to remove the undesired heavy ends and a chemical treatment is blended as at 59 with the stabilized low-boiling fraction withdrawn through line 36 to form the finished distillate product. It may be desirable to sweeten the low-boiling fraction, for example in apparatus 61, before blending it with the refined higher-boiling fraction.

It is to be understood that the specific details of apparatus and method hereinbefore set forth are for the purpose of illustration, and are not intended to be regarded as limitations upon the scope of the invention, except as contained in the following claims.

I claim:

1. The method of stabilizing hydrocarbon oil pressure distillate which comprises subjecting such distillate to a rectifying operation under substantial superatmospheric pressure such as, for example, 250 pounds per square inch wherein only excessively volatile constituents undesired in the final product are separated therefrom, passing the stabilized liquid distillate to a zone of reduced superatmospheric pressure such as, for example, 30 pounds per square inch wherein a part of the lower-boiling liquid constituents thereof are vaporized, separately withdrawing the heavier desired liquid product and subjecting it to a refining treatment to remove undesired constituents therefrom, condensing the desired low-boiling vaporous products, and blending the condensate with the refined higher boiling liquid product to produce a refined stabilized distillate product.

2. The method of stabilizing hydrocarbon oil pressure distillate which comprises subjecting such distillate to a rectifying operation under substantial superatmospheric pressure wherein only excessively volatile constituents undesired in the final product are separated therefrom in the form of vapors, passing the stabilized liquid distillate to a zone of reduced superatmospheric pressure wherein a part of the lower boiling liquid constituents thereof are vaporized, separately withdrawing the heavier desired liquid product and subjecting it to a refining treatment to remove undesired constituents therefrom, condensing the desired low-boiling vaporous products, and blending the condensate with the refined higher boiling liquid product to produce a refined stabilized distillate product.

3. The method of stabilizing hydrocarbon oil pressure distillate which comprises subjecting such distillate to a rectifying operation under substantial superatmospheric pressure wherein only excessively volatile constituents undesired in the final product are separated therefrom, passing the stabilized liquid distillate to a zone of reduced superatmospheric pressure wherein a part of the lower boiling liquid constituents thereof are vaporized, separately withdrawing the heavier desired liquid product and subjecting it to a re-running operation wherein the undesired heavier constituents are separated therefrom as a residue, condensing the separated desired low-boiling vaporous products, and blending the condensate with the re-run higher boiling liquid product to produce a stabilized refined distillate product substantially free of undesired light and heavy constituents.

4. The method of stabilizing hydrocarbon oil pressure distillate which comprises subjecting such distillate to a rectifying operation under substantial superatmospheric pressure in the order of 250 pounds per square inch wherein only excessively volatile constituents undesired in the final product are separated therefrom, passing the stabilized liquid distillate to a zone of reduced superatmospheric pressure, in the order of 30 pounds per square inch wherein a part of the lower boiling liquid constituents thereof are vaporized, separately withdrawing the heavier desired liquid product and subjecting it to a re-running operation wherein the undesired heavier constituents are separated therefrom as a residue, condensing the separated desired low-boiling vaporous products and subjecting them to a sweetening operation, and blending the sweetened condensate with the re-run higher boiling liquid product to produce a stabilized refined distillate product.

5. The method of stabilizing hydrocarbon oil pressure distillate which comprises subjecting such distillate to a rectifying operation at an elevated temperature under a relatively high superatmospheric pressure of about 250 lbs./sq. in. to separate from said distillate substantially only excessively volatile constituents undesired in the final product and recovering in said rectifying operation as a single fraction, substantially all of the said pressure distillate substantially free from most of the undesired excessively volatile fractions, separately withdrawing from said rectifying operation the said separated undesired fractions and discharging them from the system, separately withdrawing from said rectifying operation the said pressure distillate substantially free from most of the undesired excessively volatile fractions, and discharging it into a rectifying zone maintained under a materially reduced pressure of about 30 lbs./sq. in. wherein substantially only desired lower boiling constituents together with any residual undesired excessively volatile constituents are vaporized by the contained heat of the said distillate, rectifying the evolved vapors in the latter reduced pressure zone to separate therein, as distinct and separate fractions, remaining undesired excessively volatile or gaseous constituents, desired lower boiling constituents in the form of condensate, and the remaining unvaporized higher boiling portions of the said distillate, separately removing the undesired excessively volatile constituents and discharging them from the system, and withdrawing and blending the said condensed lower boiling constituents with the said higher boiling liquid portions to form the desired stable pressure distillate product.

6. The method of stabilizing hydrocarbon oil pressure distillate which comprises subjecting such distillate to a rectifying operation at an elevated temperature under a relatively high super-atmospheric pressure of about 250 pounds/sq. in. to separate from said distillate substantially only excessively volatile constituents undesired in the final product and recovering in said rectifying operation as a single fraction, substantially all of the said pressure distillate substantially free from most of the undesired excessively volatile fractions, separately withdrawing from said rectifying operation the said separated undesired fractions and discharging them from the system, separately withdrawing from said rectifying operation the said pressure distillate substantially free from most of the undesired excessively volatile fractions, and discharging it into a rectifying zone maintained under a materially reduced pressure of about 30 lbs./sq. in. wherein substantially only desired lower boiling constituents together with any residual undesired excessively volatile constituents are vaporized by the contained heat of the said distillate, rectifying the evolved vapors in the latter reduced pressure zone to separate therein, as distinct and separate fractions, remaining undesired excessively volatile or gaseous constituents, desired lower boiling constituents in the form of condensate, and the remaining unvaporized higher boiling portions of the said distillate, separately removing the undesired excessively volatile constituents and discharging them from the system, and withdrawing and treating the condensed lower boiling constituents and thereafter blending resulting treated condensate with the said higher boiling liquid portions to form the desired stable pressure distillate product.

7. A process in accordance with claim 2 wherein said condensate last mentioned is subjected to a sweetening treatment to remove undesired constituents therefrom, prior to the blending of the condensate with said refined higher boiling liquid product.

8. The method of stabilizing hydrocarbon oil pressure distillate which comprises subjecting such distillate to a rectifying operation at an elevated temperature under a relatively high superatmospheric pressure to separate from said distillate substantially only excessively volatile constituents undesired in the final product and recovering in said rectifying operation as a single fraction, substantially all of the said pressure distillate substantially free from most of the undesired excessively volatile fractions, separately withdrawing from said rectifying operation the said separated undesired fractions and discharging them from the system, separately withdrawing from said rectifying operation the said pressure distillate substantially free from most of the undesired excessively volatile fractions, and discharging it into a rectifying zone maintained under a materially reduced superatmospheric pressure wherein substantially only desired lower boiling constituents together with any residual undesired excessively volatile constituents are vaporized by the contained heat of the said distillate, rectifying the evolved vapors in the latter reduced pressure zone to separate therein, as distinct and separate fractions, remaining undesired excessively volatile or gaseous constituents, desired lower boiling constituents in the form of condensate, and the remaining unvaporized higher boiling portions of the said distillate, separately removing the undesired excessively volatile constituents and discharging them from the system, and withdrawing and blending the said condensed lower boiling constituents with the said higher boiling liquid portions to form the desired stable pressure distillate product.

JOSEPH K. ROBERTS.